E. B. MEAD.
BRAKE OPERATING MECHANISM.
APPLICATION FILED JULY 20, 1914.
1,301,290.
Patented Apr. 22, 1919
2 SHEETS—SHEET 1.
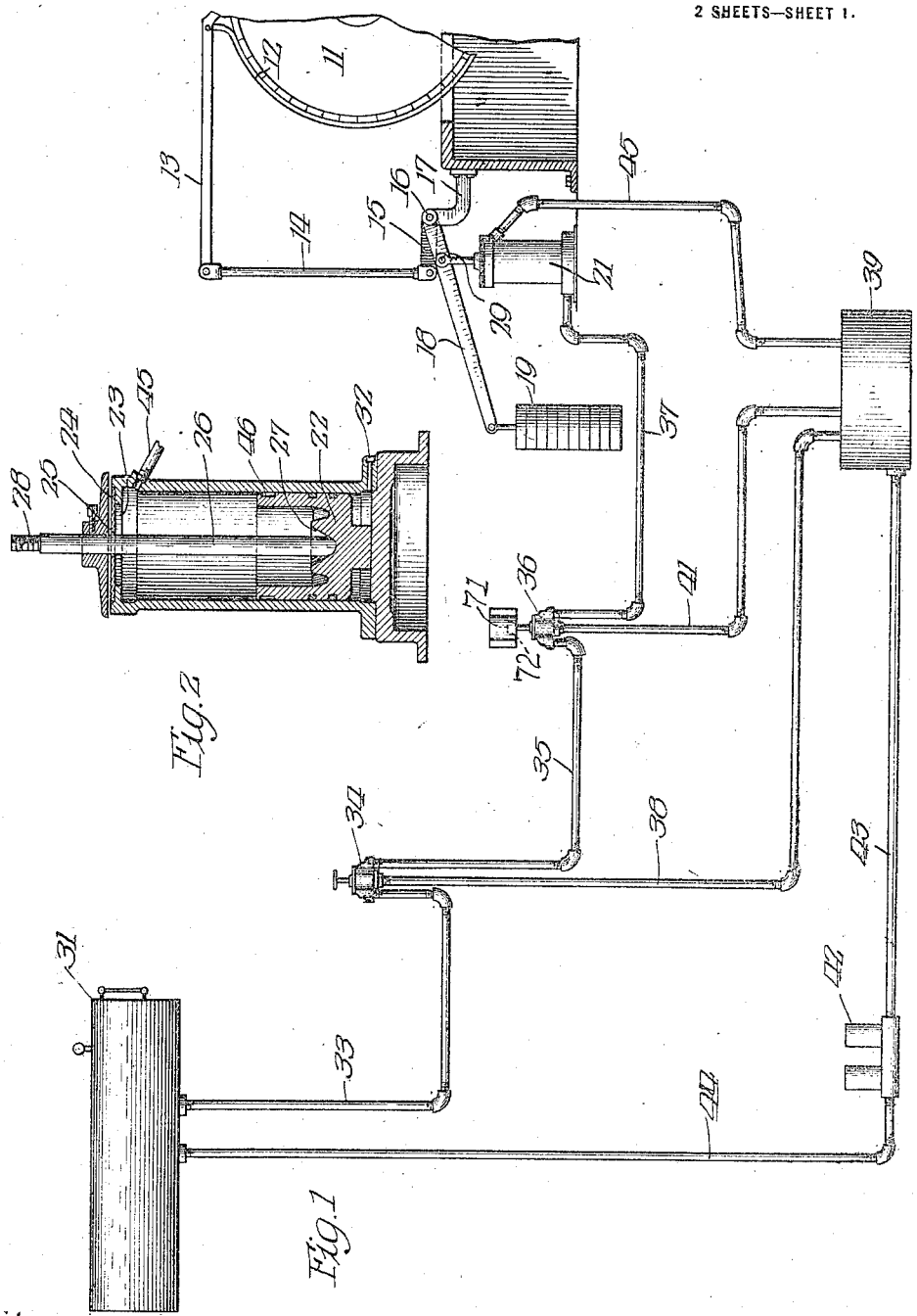
Witnesses:
Inventor:
Ezra B. Mead.

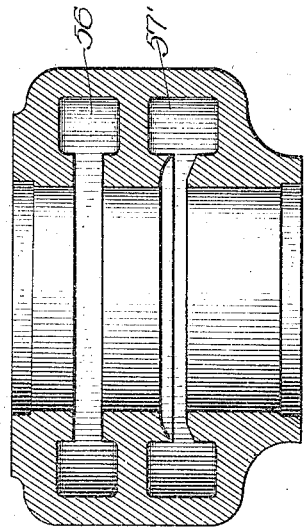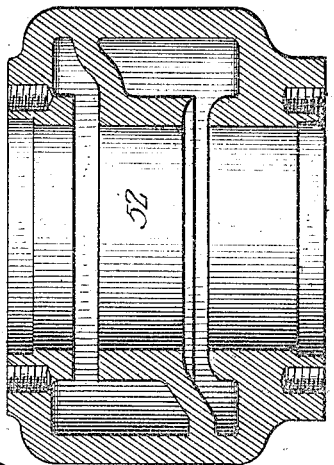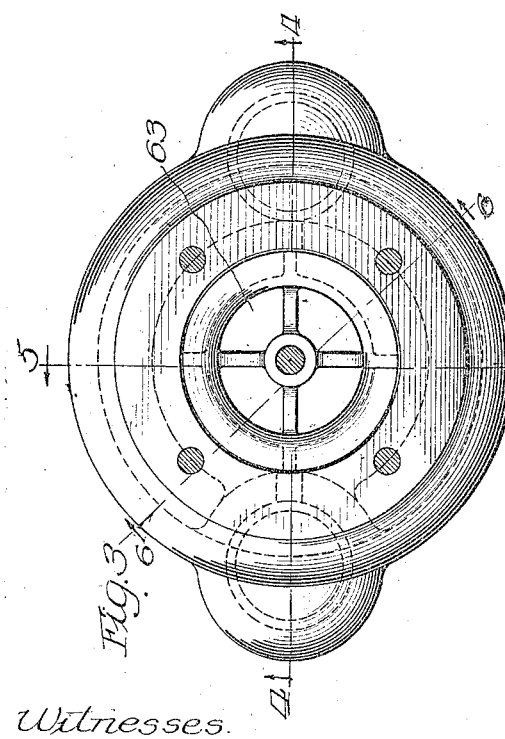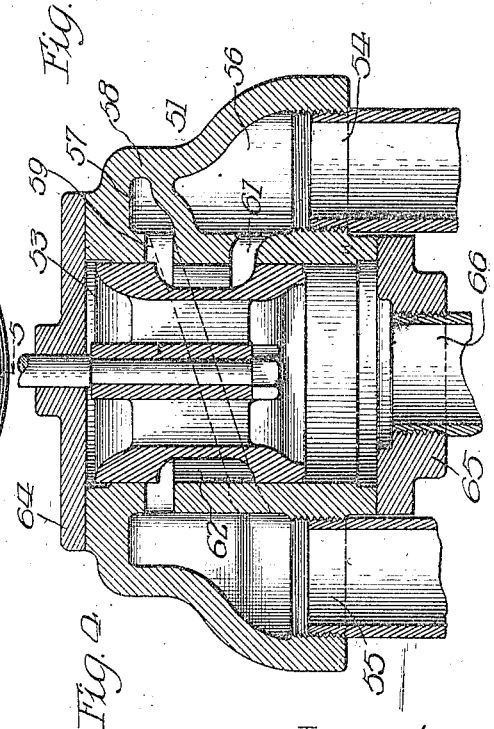

UNITED STATES PATENT OFFICE.

EZRA B. MEAD, OF OTTUMWA, IOWA, ASSIGNOR TO OTTUMWA IRON WORKS, OF OTTUMWA, IOWA, A CORPORATION OF IOWA.

BRAKE-OPERATING MECHANISM.

1,301,290.

Specification of Letters Patent.

Patented Apr. 22, 1919.

Application filed July 20, 1914. Serial No. 851,891.

*To all whom it may concern:*

Be it known that I, EZRA B. MEAD, a citizen of the United States, residing in Ottumwa, in the county of Wapello and State of Iowa, have invented a new and useful Improvement in Brake-Operating Mechanisms, of which the following is a specification.

My invention relates in general to brake operating mechanisms and more particularly to brake operating mechanisms provided for use in connection with power hoists and the like and has for its object broadly the provision of a positive and accurately operable control for devices of this character.

Power driven hoists, derricks and the like are, in many instances, provided with brakes of the band or post types normally held in set position by an arm carrying a heavy weight at one end, release of the brake being accomplished by lifting the arm against the force of gravity occasioned by the weights. This lifting is frequently accomplished by a piston moving in a cylinder under the action of compressed air. When air is used for this purpose considerable inconvenience and annoyance has been experienced by reason of the elasticity of the air and the tendency of the piston to bounce or jump in the cylinder when the air is admitted, producing an uneven action of the brake and of the hoist itself in consequence. This has been in a large measure overcome by expensive apparatus comprising an auxiliary closed oil cylinder having a piston arranged to steady the action of the air piston, either the oil piston or the oil cylinder being provided with a by-pass to permit the oil confined in the oil cylinder to move from one side of the oil piston to the other when the air piston moves to release or set the brake.

It is the principal object of my present invention to provide a brake operating mechanism which will not require the use of any auxiliary steadying devices and which will operate effectively and permit an accurate control of the hoist or other device with which the mechanism may be used.

A further object of the invention is the provision of safety devices for the prevention of over-running in the hoisting sheaves and consequent damage to the structure and to the cage.

Other objects and advantages of the invention will be apparent as it is better understood from the following description, when considered in connection with the accompanying drawing illustrating a preferred embodiment thereof.

On the drawings,

Figure 1 is a diagrammatic view of a brake control mechanism embodying my invention;

Fig. 2 is a vertical sectional view of the brake operating cylinder;

Fig. 3 is a top plan view of a valve and valve casing incorporated in my control;

Fig. 4 is a section taken substantially on the line 4—4 of Fig. 3;

Fig. 5 is a section taken through the casing proper and substantially on the line 5—5 of Fig. 3; and Fig. 6 is a similar view taken on the line 6—6 of Fig. 3.

Referring to the drawings, reference numeral 11 designates the hoisting drum of a hoist of any well known or preferred construction, the remaining parts of which are not shown as they form no part of my present invention. The drum 11 is provided with the ordinary brake band 12 adapted to be tightened by movement of the arm 13 in applying the brake. The arm 13 is connected by a rod 14 with an arm 15 fixed upon a shaft 16 journaled in suitable brackets 17. An operating arm 18 is also fixed on the shaft 16 and carries at its outer end a plurality of weights 19 which normally hold the brake in set position through the force of gravity supplied by the weights 19, this force pulling the arms 15 and 18 downwardly and through the agency of the rod 14 and arm 13 tightening the band 12 about the drum 11. In the device shown on the drawing the brake is thus normally in set position, but it will be obvious as the invention is better understood that it may be applied with equal efficiency where the operating arm is normally disposed to maintain the brake released. Movement of the arm 18 upwardly releases the brake and this movement is accomplished by means of a cylinder 21 in which moves a piston 22. The cylinder 21 is provided with a large opening 23 at its top, partially closed by a plate 24 having an aperture 25 at its center. Through this aperture extends a piston rod 26 which, in the present instance, is not permanently connected with the piston but merely rests at one end in a recess 27 in its upper face. The other end 28 of the piston rod is pivotally connected as by the connection 29 with the operating arm 18 so that when the piston is elevated, as will be later described, the operating arm will be raised and the brakes released.

The piston is operated by some incompressible fluid, oil being preferably employed. A supply of oil is maintained in a compression tank 31 which is connected by piping to be now described with an inlet 32 into the cylinder. The piping forming this connection consists, in the present instance, of a conduit 33 leading from the tank 31 to a manually operable control valve 34, a conduit 35 leading from the valve 34 to an automatically operable valve 36 and a conduit 37 leading to the inlet 32. The valves 34 and 36 are so arranged that both must be open to permit the introduction of oil or other fluid from the tank 31 to the cylinder 21. The valve 34 is connected by a conduit 38 with a sump or reservoir 39 and a similar connection 41 is provided between the valve 36 and the sump. When either valve 34 or 36 cuts off communication, as will be later described, between the tank 31 and cylinder 21, the oil which is in the cylinder 21 returns either through the pipe 38 or 41 to the sump 39. From the sump 39 it is pumped by a suitable pump 42 into the tank through conduits 43 and 44, permitting thereby the continuous use of a relatively small quantity of oil. Oil leaking either at the valves or in the cylinder will also be conveyed to the sump, the oil leaking in the valves being conveyed by the pipes 38 and 41 and the oil leaking in the cylinder past the piston through a connection 45. This connection takes in to the upper portion of the cylinder and adjacent the upper limit of travel of the piston. In the piston an annular recess 46 is provided in which the oil seeping past the contact faces of the piston and cylinder will collect and from which it will be received into the connection 45, the recess 46 and intake of the connection 45 being arranged so that they communicate when the piston is in upper position.

The valve construction is shown in an enlarged scale in Figs. 3 to 6 inclusive. The two valves 34 and 36 are exact duplicates of each other and the following description will apply to either. A casing 51 is provided through which extends an opening 52, the bounding surface of which forms a seat for a cylindrical longitudinally movable valve 53. Extending into the bottom of the casing on opposite sides are two openings 54 and 55, one, 54, being adapted to be connected with the compression tank and the other, 55, with the operating cylinder. Two recesses, 56 and 57, communicate respectively with the openings 54 and 55. These recesses are disposed one above the other and are separated by a partition 58 and they extend substantially around the casing, the recess 56, which is the lower one and which is the one connected with the opening 54, extending to adjacent the opening 55, and the recess 57, which is the upper one and which communicates with the opening 55, extending completely about the casing. These recesses are of varying cross-sectional area, being largest at their respective openings 54 and 55 and smallest on the opposite side of the casing. They each communicate throughout their length by ports 59 and 61, with the interior of the casing. The ports 59 and 61 are adapted to be thrown into communication through recesses 62 provided in the cylindrical face of the valve 53. The varying cross-sectional area of the recesses is provided so that the oil may leave simultaneously from the recess 56 throughout the entire length of the port 61, the recess being larger nearer the inlet and diminishing toward the ends of the outlet port so that an even distribution of oil through the port may occur, the varying size of the recess 57 which receives the oil through the port 59 permitting the oil to flow in and increase in volume as it approaches the opening 55. The valve 53 is provided with a number of apertures 63 and the casing is closed at its top and bottom by plates 64 and 65 and the bottom one of which is provided with an outlet 66 to the sump. Any leakage in the valve will flow down through the outlet either beneath the valve or over its top and down through the apertures 63. The valve is disposed in upper position or that shown in Fig. 4 when communication is desired between the openings 54 and 55. When, however, it is desired to break this communication and to permit the brake to set, the valve is moved downwardly so that only the port 61 communicates with the recesses 62 in the valve and the opening 53 is thereby thrown into communication with the said outlet 66 over the top of the valve and down through the apertures 63, as will be readily appreciated by viewing Fig. 4.

The valve 36, which is the automatically operable valve, may be controlled in any preferred or usual manner to bring it into operation to cut off communication between the compression tank and the operating cylinder at desired points in the travel of the cage or platform to the hoist. In the present instance, however, it is shown as controlled by an electromagnet 71. The stem of the valve carries an armature 72, the armature and magnet being so arranged that when the cage (not shown) reaches a predetermined point in its travel, either the armature is attracted and the valve thus closed or the magnet becomes deënergized and produces thereby a resulting movement of the valve to cut off communication between the tank and the operating cylinder. The manually operable valve 34 may be controlled by a movable handle or through any other mechanical agencies. Where oil is used or any incompressible liquid or fluid the brake is given a smooth positive action that experience has demonstrated cannot be attained by the use of air without providing some means for restraining the elastic properties of the air. The means usually provided slow the action of the air and prevent in large measure rapid operation of the brake and prevent also nicety of control of the speed of the hoist by means of the brake.

It is believed that the invention and many of its attendant advantages will be understood from the foregoing without further description, and it will be apparent that various changes both in the nature of the fluid itself and of the apparatus described may be made without departing from the spirit and scope of the invention or sacrificing any of its material advantages, the form hereinbefore described being merely a preferred embodiment thereof.

I claim:

1. A power hoist, comprising in combination a hoist drum, a brake engaging said drum, means normally acting to tighten the brake, a brake cylinder, a tank for holding a supply of incompressible fluid under pressure, a sump, a pipe line connecting said cylinder, tank and sump, means for supplying said fluid from said sump to said tank, and a valve in said pipe line for interrupting the flow of liquid from the tank to the cylinder.

2. A power hoist, comprising in combination a hoist drum, a brake engaging said drum, means normally acting to tighten the brake, a brake cylinder, a tank for holding a supply of oil under pressure, a sump, a pipe line connecting said cylinder, tank and sump, means for supplying said oil from said sump to said tank, and a valve in said pipe line for interrupting the flow of oil from the tank to the cylinder.

3. A power hoist, comprising in combination a hoist drum and a brake for engaging said drum, a brake cylinder, a tank for holding a supply of incompressible fluid under pressure, a sump, means for delivering the incompressible fluid from said sump to said tank under pressure, a pipe line leading from the tank to the cylinder, a valve in the pipe line for controlling communication of said incompressible fluid from said tank to said cylinder, and means for returning exhaust fluid to said sump.

4. A power hoist, comprising in combination a hoist drum, a brake for engaging said drum, a brake cylinder, a tank for holding an incompressible fluid, a sump, a pipe line between said tank and said cylinder, a valve in said pipe line, said valve when in one position serving to establish communications through itself between said tank and said cylinder to conduct liquid from said tank to said cylinder and when in the second position to permit exhaust of liquid in said cylinder back through said valve to said sump.

5. In a brake operating mechanism the combination of a brake operating arm, a cylinder, a piston mounted in said cylinder and adapted to actuate said brake operating arm, a supply of an incompressible fluid, connections between said supply and said cylinder, a manual and an electrically controlled valve in said connection, a sump, connections between each of said valves to said sump, and a pump for conveying fluid from said sump to said supply.

6. A power hoist, comprising in combination a hoist drum, a brake engaging said drum, gravity means acting normally to tighten said brake on said drum, a brake cylinder, a piston in said cylinder and engaging said gravity means to lift the same and release the brake, a tank for holding a supply of incompressible fluid, deliverable under pressure to said cylinder, a sump, a pipe line connecting said cylinder, tank and sump, means for supplying said fluid from said sump to said tank, and a valve in said pipe line for controlling the flow of liquid from the tank to the cylinder.

7. A power hoist, comprising in combination a hoist drum, a brake engaging said drum, gravity means acting normally to tighten said brake on said drum, a brake cylinder, a tank for holding a supply of oil under pressure, a sump, a pipe line connecting said cylinder, tank and sump, means for supplying said oil from said sump to said tank, and a valve in said pipe line for interrupting the flow of oil from the tank to the cylinder.

Signed this 15th day of July, 1914, in the presence of two witnesses.

EZRA R. MEAD.

Witnesses:
ALFRED BRIGGS,
J. W. MEASHAM.